US012513462B2

(12) United States Patent
Lan

(10) Patent No.: US 12,513,462 B2
(45) Date of Patent: Dec. 30, 2025

(54) COMBO SYSTEM, METHOD OF DRIVING COMBO SYSTEM, SIGNAL PROCESSOR, AND STORAGE MEDIUM

(71) Applicant: AAC Technologies (Nanjing) Co., Ltd., Jiangsu (CN)

(72) Inventor: Ruizhi Lan, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 172 days.

(21) Appl. No.: 18/401,299

(22) Filed: Dec. 29, 2023

(65) Prior Publication Data

US 2024/0340587 A1 Oct. 10, 2024

Related U.S. Application Data

(63) Continuation of application No. PCT/CN2023/087029, filed on Apr. 7, 2023.

(51) Int. Cl.
*H04R 3/04* (2006.01)
*H04R 5/04* (2006.01)

(52) U.S. Cl.
CPC ................. *H04R 3/04* (2013.01); *H04R 5/04* (2013.01)

(58) Field of Classification Search
CPC .......... H03F 3/245; H02N 2/001; H04R 3/04; H04R 2430/01; H04R 2499/11; H04R 5/04; G08B 6/00; G08B 3/10
USPC ......................... 381/162–164, 120, 121, 123
See application file for complete search history.

(56) References Cited

U.S. PATENT DOCUMENTS 12,335,699 B2 * 6/2025 Ye ............................ G08B 6/00
2019/0379977 A1 * 12/2019 Büttner .................. G06N 3/088
2024/0340586 A1 * 10/2024 Lan .......................... H04R 3/04

* cited by examiner

*Primary Examiner* — Xu Mei
(74) *Attorney, Agent, or Firm* — Wiersch Law Group

(57) ABSTRACT

A Combo system, a method of driving the Combo system, a signal processor, and a storage medium are provided. The Combo system includes a loudspeaker, a motor, an analog divider, a power amplifier, a signal fuser, and a signal processor. The signal fuser fuses the loudspeaker digital signal with a digital signal of the motor to obtain a fused digital signal. The signal processor predicts voltage data loaded on two ends of the loudspeaker and two ends of the motor if the fused digital signal transmits to the analog frequency divider and the analog frequency divider performs the frequency division; and corrects the loudspeaker digital signal and/or the motor digital signal based on the predicted voltage data to enable the loudspeaker analog signal to be consistent with the loudspeaker digital signal and enable the motor analog signal to be consistent with the motor digital signal.

15 Claims, 6 Drawing Sheets

COMBO SYSTEM, METHOD OF DRIVING COMBO SYSTEM, SIGNAL PROCESSOR, AND STORAGE MEDIUM

TECHNICAL FIELD

The present disclosure relates to a technical field of signal processing, and in particular to a Combo system, a method of driving the Combo system, a signal processor, and a storage medium.

BACKGROUND

In the related art, a Combo component (i.e., one sound and tactile integrated component) is generally driven by a power amplifier. The Combo component includes a loudspeaker, a motor connected in series with the loudspeaker, and an analog frequency divider connected to the loudspeaker and the motor. In practice, the power amplifier receives a fused digital signal that fuses a digital signal of the loudspeaker with a digital signal of the motor; converts a received fused digital signal into a fused analog signal; performs power amplification on the fused analog signal, and transmits an amplified analog signal to the analog frequency divider of the Combo component. The analog frequency divider performs frequency division on the fused analog signal received by the analog frequency divider itself to obtain a loudspeaker analog signal and a motor analog signal correspondingly. The loudspeaker analog signal is loaded to two ends of the loudspeaker, and the motor analog signal is loaded to two ends of the motor. In this way, the loudspeaker and the motor are driven. However, the analog frequency divider causes distortion in frequency response amplitudes and phases, as a result, the loudspeaker analog signal, which is actually loaded to the two ends of the loudspeaker, and the motor analog signal, which is actually loaded to the two ends of the motor, are distorted. Therefore, a large difference is generated between an actual loudspeaker analog signal and a desired loudspeaker digital signal, and a large difference is generated between an actual motor analog signal and a desired motor digital signal, such that the loudspeaker and the motor do not operate as expected, a step effect of the Combo component is affected significantly, and user experience is reduced.

Therefore, the above method of driving the Combo component needs to be improved.

SUMMARY OF THE DISCLOSURE

The present disclosure provides a Combo system, a method of driving a Combo system, a signal processor, and a storage medium.

In a first aspect, a Combo system is provided and includes a loudspeaker, a motor connected in series with the loudspeaker, an analog frequency divider connected to the loudspeaker and the motor, a power amplifier connected to the analog frequency divider, and a signal fuser connected to the power amplifier. The signal fuser is configured to fuse a loudspeaker digital signal of the loudspeaker with a motor digital signal of the motor to obtain a fused digital signal; the loudspeaker digital signal comprises an original loudspeaker digital signal, the motor digital signal comprises an original motor digital signal; the power amplifier is configured to perform digital-to-analog conversion on the fused digital signal to obtain a fused analog signal and to perform power amplification on the fused analog signal; the analog frequency divider is configured to perform frequency division on the fused analog signal that is power-amplified to obtain a loudspeaker analog signal and a motor analog signal, the loudspeaker analog signal is configured to drive the loudspeaker, and the motor analog signal is configured to drive the motor. The Combo system further includes a signal processor connected to the signal fuser; the signal processor is configured to: predict voltage data loaded on two ends of the loudspeaker and voltage data loaded on two ends of the motor if the fused digital signal transmits to the analog frequency divider and the analog frequency divider performs the frequency division on the fused digital signal; correct the original loudspeaker digital signal in the fused digital signal based on the predicted voltage data loaded on the two ends of the loudspeaker to obtain a corrected loudspeaker digital signal and/or correct the original motor digital signal in the fused digital signal based on the predicted voltage data loaded on the two ends of the motor to obtain a corrected motor digital signal. A phase of the loudspeaker analog signal is consistent with a phase of the corrected loudspeaker digital signal; an amplitude of the loudspeaker analog signal is consistent with an amplitude of the corrected loudspeaker digital signal; a phase of the motor analog signal is consistent with a phase of the corrected motor digital signal; and an amplitude of the motor analog signal is consistent with an amplitude of the corrected motor digital signal. The loudspeaker digital signal further comprises the corrected loudspeaker digital signal, and the motor digital signal further comprises the corrected motor digital signal.

In a second aspect, a method of driving a Combo system is provided and includes: fusing, by a signal fuser, a loudspeaker digital signal of a loudspeaker with a motor digital signal of a motor to obtain a fused digital signal. The loudspeaker digital signal comprises an original loudspeaker digital signal, the motor digital signal comprises an original motor digital signal; performing, by a power amplifier, digital-to-analog conversion on the fused digital signal to obtain a fused analog signal, and performing, by the power amplifier, power amplification on the fused analog signal; performing, by an analog frequency divider, frequency division on the fused analog signal that is power-amplified to obtain a loudspeaker analog signal and a motor analog signal. The loudspeaker analog signal is configured to drive the loudspeaker, and the motor analog signal is configured to drive the motor; predicting, by a signal processor, voltage data loaded on two ends of the loudspeaker and voltage data loaded on two ends of the motor if the fused digital signal transmits to the analog frequency divider and the analog frequency divider performs the frequency division on the fused digital signal; correcting, by the signal processor, the original loudspeaker digital signal in the fused digital signal based on the predicted voltage data loaded on two ends of the loudspeaker to obtain a corrected loudspeaker digital signal; and/or correcting, by the signal processor, the original motor digital signal in the fused digital signal based on the predicted voltage data loaded on two ends of the motor to obtain a corrected motor digital signal. A phase of the loudspeaker analog signal is consistent with a phase of the corrected loudspeaker digital signal. An amplitude of the loudspeaker analog signal is consistent with an amplitude of the corrected loudspeaker digital signal; a phase of the motor analog signal is consistent with a phase of the corrected motor digital signal; and an amplitude of the motor analog signal is consistent with an amplitude of the corrected motor digital signal. The loudspeaker digital signal further comprises the corrected loudspeaker digital signal, and the motor digital signal further comprises the corrected motor digital signal.

In a third aspect, a non-transitory computer-readable storage medium is provided and stores a computer program. The computer program is configured to perform, when being invoked by a processor, the method of the second aspect.

In the present disclosure, the signal fuser fuses the original loudspeaker digital signal and the original motor digital signal to obtain a first fused digital signal; and inputs the first fused digital signal to the signal processor. The signal processor predicts the voltage loaded to the two ends of the loudspeaker and the voltage loaded to the two ends of the motor if the first fused digital signal is transmitted to and is divided by the analog frequency divider. Further, the signal processor corrects the original loudspeaker digital signal based on the predicted voltage to obtain the corrected loudspeaker digital signal; and/or corrects the original motor digital signal based on the predicted voltage to obtain the corrected motor digital signal. The signal fuser fuses the corrected loudspeaker digital signal and the corrected motor digital signal to obtain a second fused digital signal and inputs the second fused digital signal to the power amplifier. The power amplifier performs analog-to-digital conversion on the second fused digital signal to obtain the fused analog signal, and performs power amplification on the fused analog signal. The analog frequency divider performs frequency division on the power-amplified fused analog signal to obtain the loudspeaker analog signal to drive the speaker and obtain the motor analog signal to drive the motor. In the above process, the signal processor, which is connected to the signal fuser, predicts the voltage data loaded on the two ends of the loudspeaker and the voltage data loaded on the two ends of the motor if the first fused digital signal transmits to the analog frequency divider and is divided by the analog frequency divider. Further, the signal processor corrects the original loudspeaker digital signal and/or the original motor digital signal according to the voltage data. In this way, the phase and the amplitude of the loudspeaker analog signal that is actually loaded to the loudspeaker is consistent with the phase and the amplitude of an expected loudspeaker digital signal; and the phase and the amplitude of the motor analog signal that is actually loaded to the motor is consistent with the phase and the amplitude of an expected motor digital signal. Therefore, the loudspeaker and the motor can operate as expected.

BRIEF DESCRIPTION OF THE DRAWINGS

In order to more clearly illustrate the technical solutions in the related art or in embodiments of the present disclosure, the following for describing the art or the embodiments of the present disclosure will be introduced in brief in the following. Obviously, the following accompanying drawings show only some of but not all of the embodiments of the present disclosure. Any ordinary skilled person in the prior art can obtain other drawings based on the following drawings without making any creative work.

DETAILED DESCRIPTION

Figure 1:
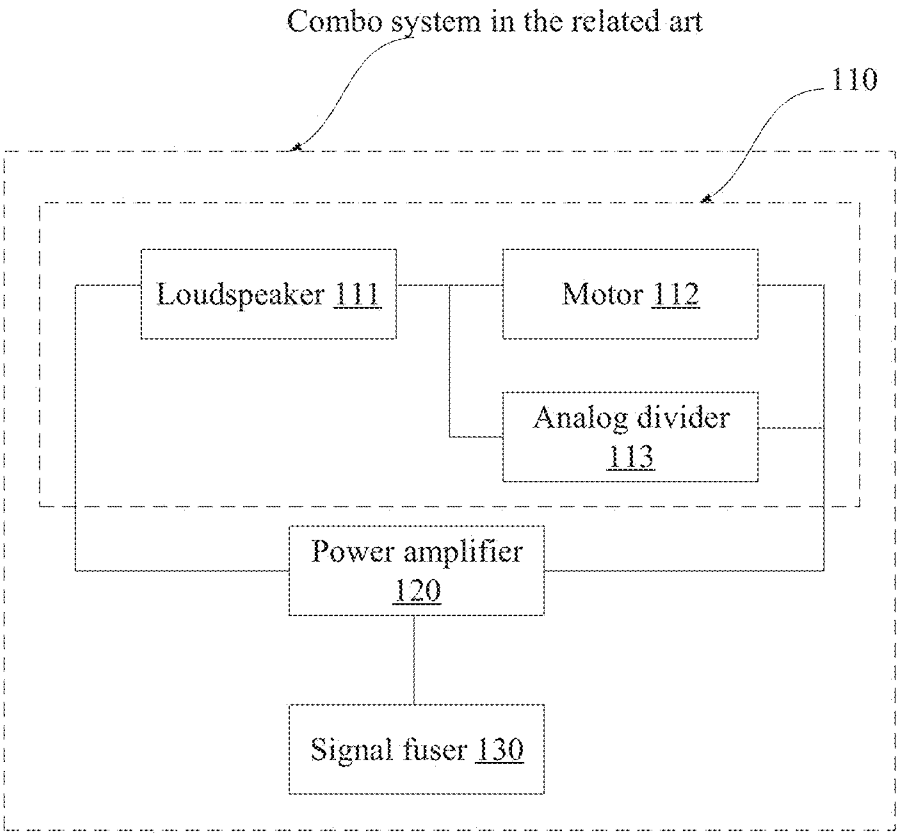
FIG. 1 Related Art
FIG. 1 is a block diagram of modules of a Combo system in the related art.

In order to make the objectives, technical solutions, and advantages of the present disclosure more obvious and understandable, the present disclosure will be described clearly and completely in the following by referring to embodiments of the present disclosure and the corresponding accompanying drawings. A same or similar reference numeral from the beginning to the end of the description denote a same or similar element or elements having a same or similar function. It should be understood that the various embodiments of the present disclosure described herein are only for explaining the present disclosure and do not limit the present disclosure. That is, all other embodiments, which are obtained by any ordinary skilled person in the related art based on the various embodiments of the present disclosure and without making creative work, shall fall within the scope of the present disclosure. In addition, technical features described below in the various embodiments of the present disclosure can be combined with each other as long as the features do not conflict with each other.

Figure 2:
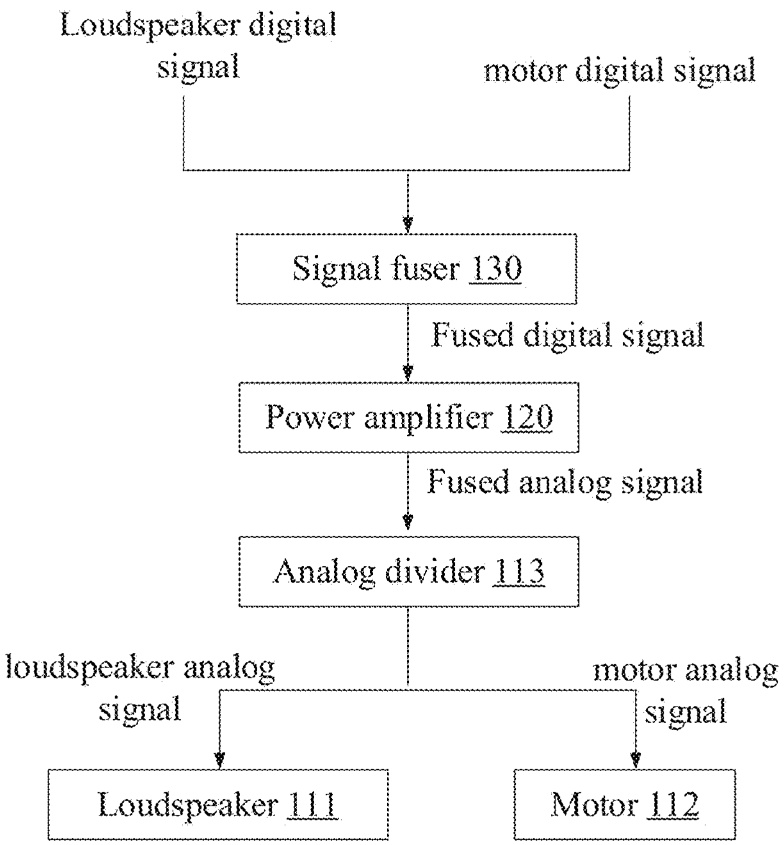
FIG. 2 Related Art
FIG. 2 is a schematic view of a signal transmission of the Combo system in the related art.

FIG. 1 is a block diagram of modules of a Combo system in the related art. The Combo system in the related art includes a Combo component 110, a power amplifier 120 connected to the Combo component 110, and a signal fuser 130 connected to the power amplifier 120. The Combo component 110 includes a loudspeaker 111, a motor 112, and an analog frequency divider 113. The motor 112 is connected in series with the loudspeaker 111. The analog frequency divider 113 is electrically connected to the loudspeaker 111 and the motor 112. The power amplifier 120 is electrically connected to the analog frequency divider 113. The signal fuser 130 is electrically connected to the power amplifier 120. FIG. 2 is a schematic diagram showing signal transmission in the Combo system in the related art. In practice, the signal fuser 130 fuses the loudspeaker digital signal of the loudspeaker with a motor digital signal of the motor to obtain a fused digital signal. The power amplifier 120 performs digital-to-analog conversion on the fused digital signal to obtain a fused analog signal; and performs power amplification on the fused analog signal. The analog frequency divider 113 performs frequency division on the fused analog signal that is power-amplified to obtain a loudspeaker analog signal configured to drive the loudspeaker 111 and obtain a motor analog signal configured to drive the motor 112. For the Combo system in the related art, the analog frequency divider 113 is configured as a separated capacitor component or a frequency divider circuit formed by a capacitor, an inductor, and a resistor. The frequency division performed on the fused analog signal by the analog frequency divider 113 is equivalent to voltage division performed on the fused analog signal by the capacitor.

Figure 3:
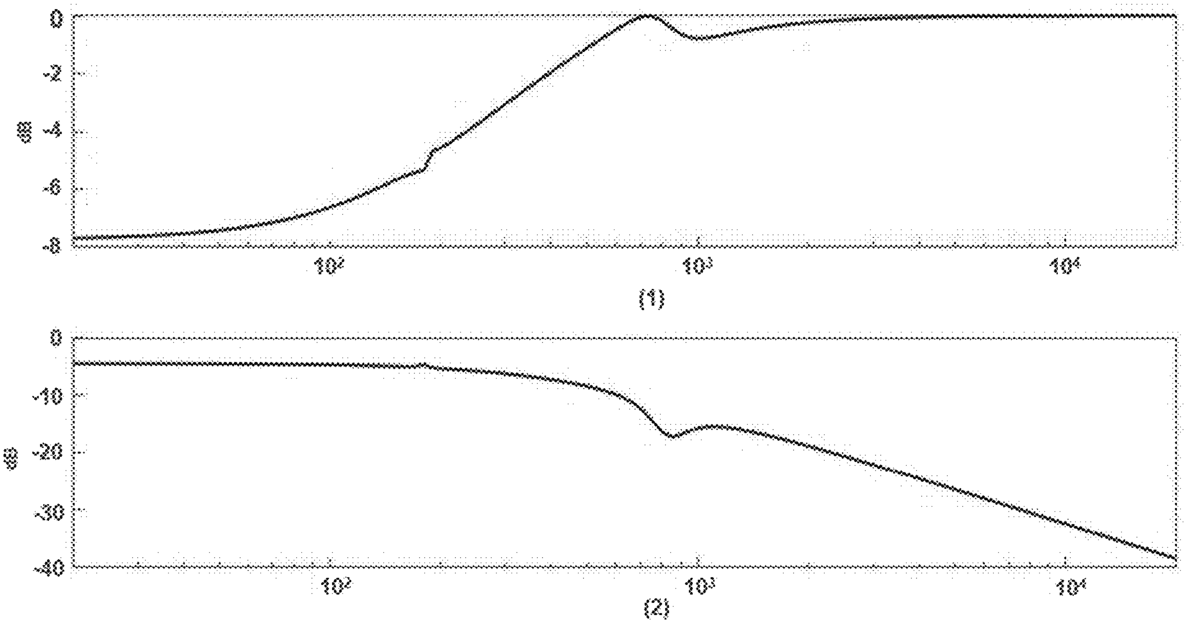
FIG. 3 Related Art
FIG. 3 shows, in the Combo system in the related art, distortion in an amplitude in a frequency domain of the loudspeaker analog signal loaded to two ends of the loudspeaker and distortion in an amplitude in the frequency domain of the motor analog signal loaded to two ends of the motor.
Figure 4:
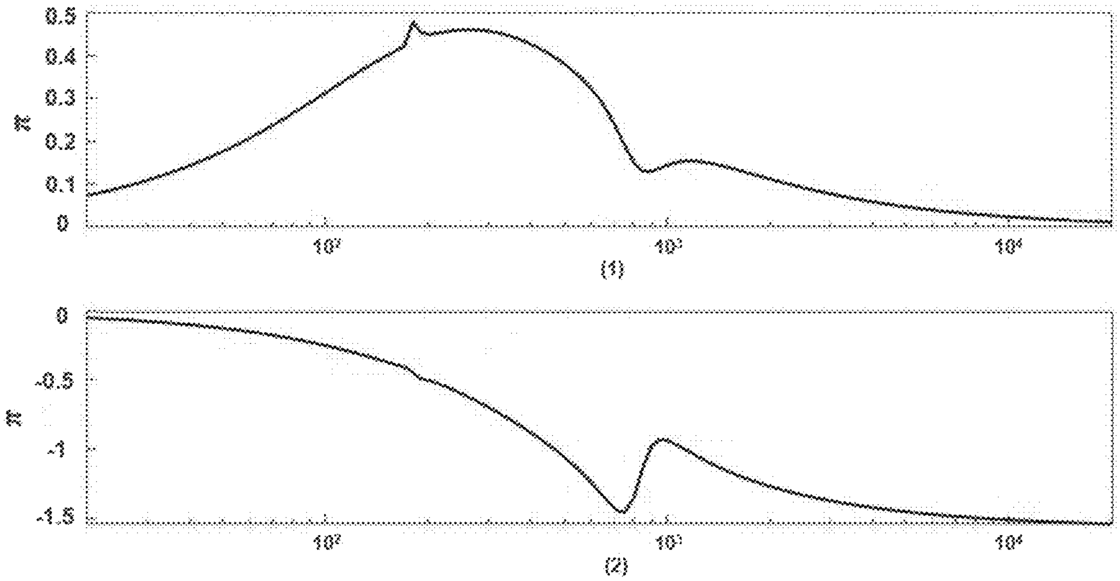
FIG. 4 Related Art
FIG. 4 shows, in the Combo system in the related art, distortion in a phase in the frequency domain of the loudspeaker analog signal loaded to two ends of the loudspeaker and distortion in a phase in the frequency domain of the motor analog signal loaded to two ends of the motor.

However, for the Combo system in the related art, the analog frequency divider 113 causes distortion in frequency response amplitudes and phases, as a result, the loudspeaker analog signal, which is actually loaded to the two ends of the loudspeaker 111, and the motor analog signal, which is actually loaded to the two ends of the motor 112, are distorted (As shown in FIG. 3 and FIG. 4, a panel (1) in FIG. 3 and a panel (1) in FIG. 4 correspond to the loudspeaker 111, and a panel (2) in FIG. 3 and a panel (2) in FIG. 4 correspond to the motor 112). Therefore, a large difference is generated between an actual loudspeaker analog signal and a desired loudspeaker digital signal, and a large difference is generated between an actual motor analog signal and a desired motor digital signal, such that the loudspeaker 111 and the motor 112 do not operate as expected, a step effect of the Combo component 110 is affected significantly, and user experience is reduced. Therefore, the present disclosure provides improvements on the Combo system in the related art, and the Combo system 100 provided by the present disclosure will be described in detail below.

Figure 5:
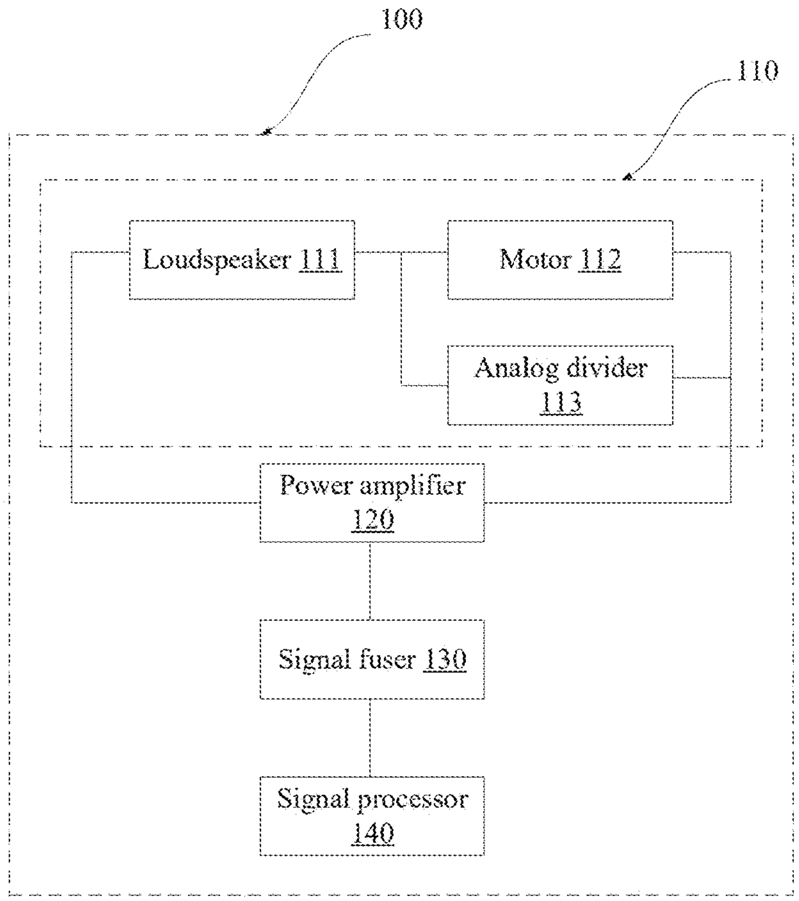
FIG. 5 is a schematic diagram of modules of the Combo system according to one embodiment of the present disclosure.
Figure 6:
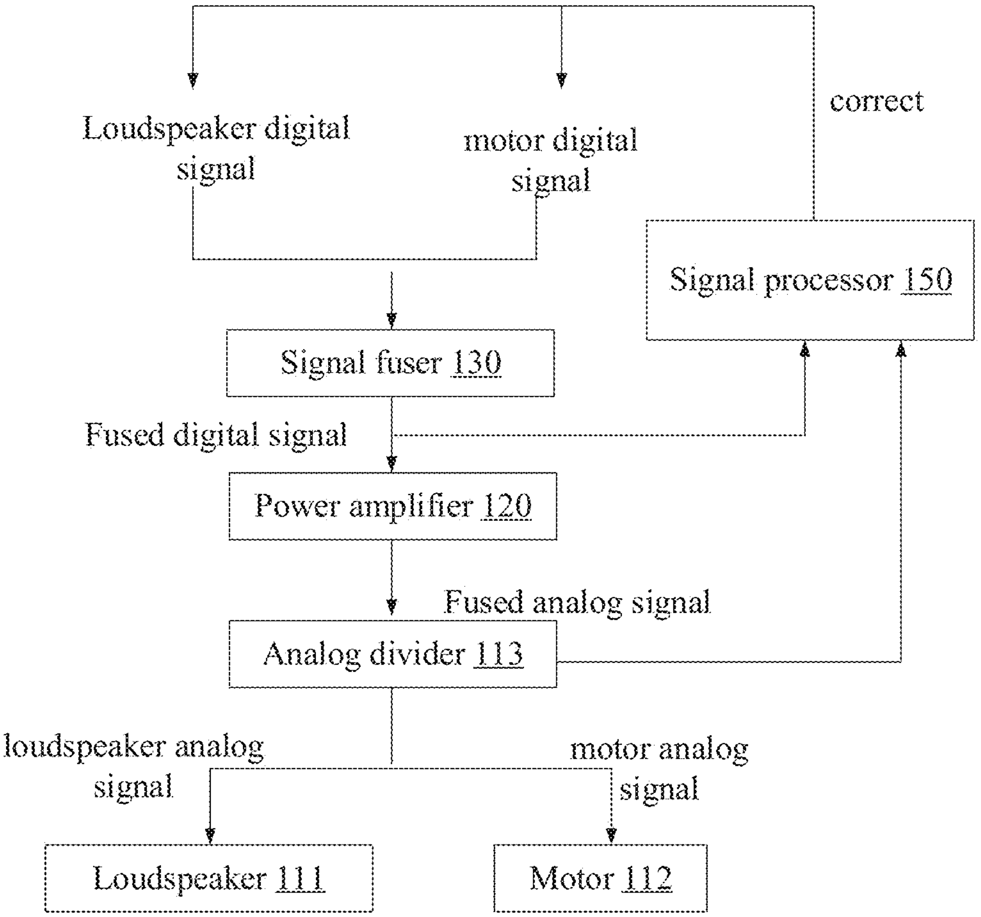
FIG. 6 is a schematic diagram of a signal transmission of the Combo system according to one embodiment of the present disclosure.

FIG. 5 is a block diagram of modules of a Combo system according to one embodiment of the present disclosure. In some embodiments, the Combo system 100 includes a Combo component 110, a power amplifier 120 electrically connected to the Combo component 110, a signal fuser 130 electrically connected to the power amplifier 120, a signal processor 140 electrically connected to the signal fuser 130. The Combo component 110 includes a speaker 111, a motor 112, and an analog frequency divider 113. The motor 112 is connected in series with the loudspeaker 111, the analog frequency divider 113 is electrically connected to the loudspeaker 111 and the motor 112. The power amplifier 120 is electrically connected to the analog frequency divider 113. The signal fuser 130 is electrically connected to the power amplifier 120, and the signal processor 140 is electrically connected to the signal fuser 130. Specifically, FIG. 6 is a schematic diagram showing signal transmission in the Combo system according to one embodiment of the present disclosure. In practice, the signal fuser 130 fuses the loudspeaker digital signal with a motor digital signal of the motor to obtain a fused digital signal. The power amplifier 120 performs digital-to-analog conversion on the fused digital signal to obtain a fused analog signal; and performs power amplification on the fused analog signal. The analog frequency divider 113 performs frequency division on the fused analog signal that is power-amplified to obtain a loudspeaker analog signal to drive the loudspeaker 111 and obtain a motor analog signal to drive the motor 112. However, unlike the Combo system in the related art, before the power amplifier 120 of the present disclosure receives the fused digital signal sent from the signal fuser 130, the signal processor 140 predicts the voltage data loaded to the two ends of the loudspeaker 111 and the two ends of the motor 112 if the fused digital signal is transmitted to the analog frequency divider 113 and divided by the analog frequency divider 113. Further, the signal processor 140 corrects the loudspeaker digital signal and/or the motor digital signal based on the voltage data. Further, the corrected loudspeaker digital signal and/or the corrected motor digital signal are fused with each other by the signal fuser 130, and the fused digital signal is transmitted to the power amplifier 120. The correction enables the loudspeaker analog signal that is actually loaded to the two ends of the loudspeaker 111 to be consistent with the corrected loudspeaker digital signal thereof; and enables the motor analog signal that is actually loaded to the two ends of the motor 112 to be consistent with the corrected motor digital signal thereof. In detail, the phase of the loudspeaker analog signal that is actually loaded to the two ends of the loudspeaker 111 is consistent with the phase of the corrected loudspeaker digital signal, and the amplitude of the loudspeaker analog signal that is actually loaded to the two ends of the loudspeaker 111 is consistent with the amplitude of the corrected loudspeaker digital signal. The phase of the motor analog signal that is actually loaded to the two ends of the motor 112 is consistent with the phase of the corrected motor digital signal, and the amplitude of the motor analog signal that is actually loaded to the two ends of the motor 112 is consistent with the amplitude of the corrected motor digital signal. In this way, the loudspeaker 111 and the motor 112 of the Combo component 110 can operate as expected.

In one embodiment, in the process of predicting the voltage data loaded on the two ends of the loudspeaker 111 and the two ends of the motor 112 if the fused digital signal is transmitted to the analog frequency divider 113 and divided by the analog frequency divider 113, the signal processor 140 firstly obtains a circuit parameter (a linear parameter and/or a nonlinear parameter) of the analog frequency divider 113, a circuit parameter of the loudspeaker 111, and a circuit parameter of the motor 112. Further, the frequency-division predictor 150 predicts, based on the obtained circuit parameters, the voltage data loaded on the two ends of the loudspeaker 111 and the voltage data loaded on the two ends of the motor 112 if the fused digital signal is transmitted to the analog frequency divider 113 and divided by the analog frequency divider 113. In the process of correcting the loudspeaker digital signal and/or the motor digital signal, the signal processor 140 corrects the phase and/or the amplitude of the loudspeaker digital signal in the frequency domain; and/or corrects the phase and/or the amplitude of the motor digital signal in the frequency domain.

In one embodiment, when signals are being transmitted, deviation occurs, and the circuits themselves have subtle defects. That is, when the loudspeaker digital signal and/or the motor digital signal is corrected only once, a desired effect is not achieved. Therefore, in the present embodiment, the signal processor 140 is further connected to the analog frequency divider 113, and the analog frequency divider 113 transmits the loudspeaker analog signal and the motor analog signal to the signal processor 140. Further, the signal processor 140 determines a loudspeaker amplitude similarity value between the amplitude of the loudspeaker analog signal and the amplitude of the corrected loudspeaker digital signal, a loudspeaker phase similarity value between the phase of the loudspeaker analog signal and the phase of the corrected loudspeaker digital signal, a motor amplitude similarity value between the amplitude of the motor analog signal and the amplitude of the corrected motor digital signal, a motor phase similarity value between the motor of the loudspeaker analog signal and the motor of the corrected loudspeaker digital signal. The signal processor 140 subsequently determines whether to correct the corrected loudspeaker digital signal and/or the corrected motor digital signal again based on the loudspeaker amplitude similarity value, the loudspeaker phase similarity value, the motor amplitude similarity value, and the motor phase similarity value. In some embodiments, the signal processor 140 determines not to correct the corrected loudspeaker digital signal and/or the corrected motor digital signal again in response to: each of the loudspeaker amplitude similarity value, the loudspeaker phase similarity value, the motor amplitude similarity value, and the motor phase similarity value being greater than or equal to a predetermined similarity threshold; and determines to correct the corrected loudspeaker digital signal and/or the corrected motor digital signal again in response to: any one of the loudspeaker amplitude similarity value, the loudspeaker phase similarity value, the motor amplitude similarity value, and the motor phase similarity value being less than the predetermined similarity threshold.

The above embodiments show only preferred embodiments of the present disclosure, but are not the only limitation of the Combo System 100. In this regard, any ordinary skilled person in the related art can flexibly configure the Combo System 100 based on actual application scenarios and based on the above embodiments.

Figure 7:
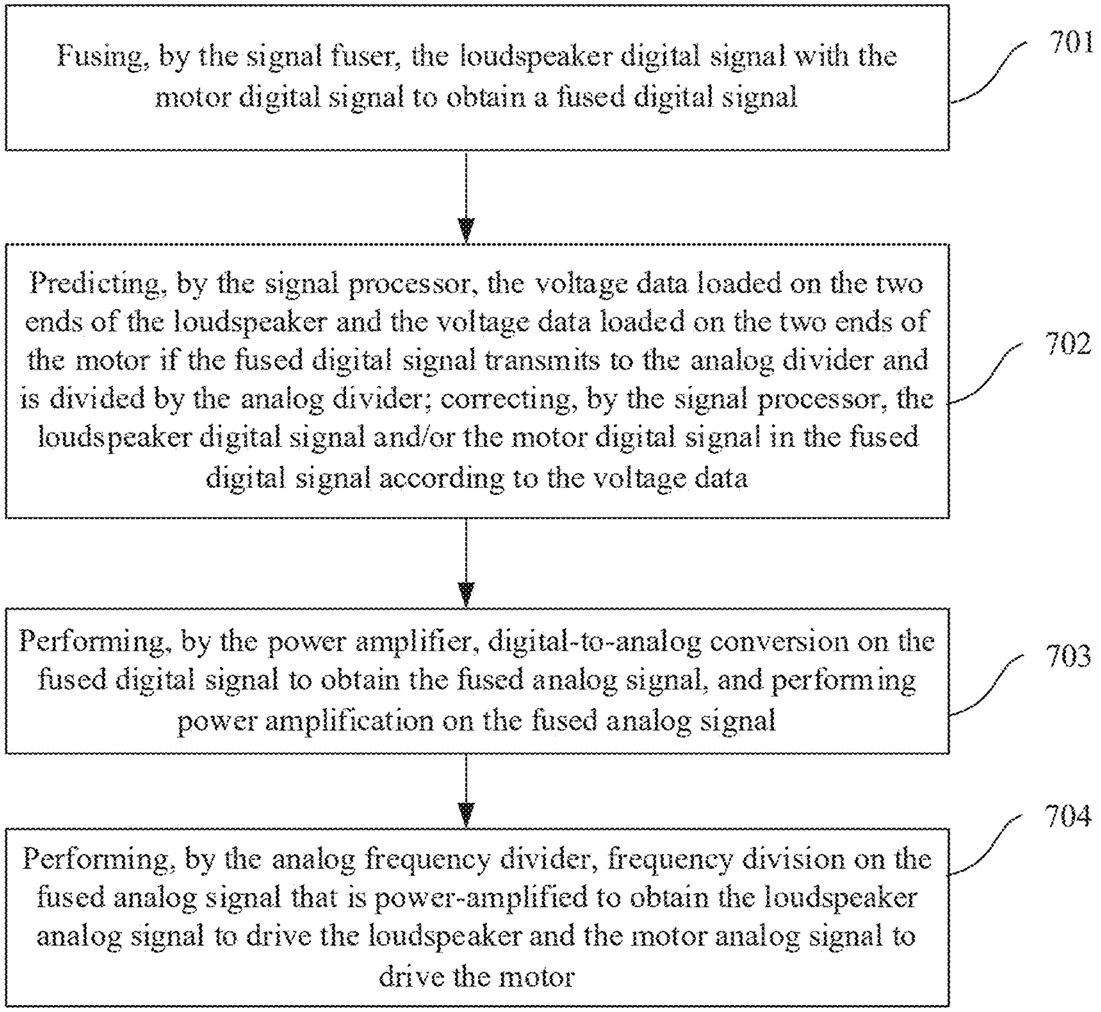
FIG. 7 is a flow chart of a method of driving the Combo system according to one embodiment of the present disclosure.

FIG. 7 is a flow chart of a method of driving the Combo system according to an embodiment of the present disclosure. The present disclosure further provides the method of driving the Combo system. The method is performed by the Combo system 100 in the above embodiments of the present disclosure. In some embodiments, the method includes following operations. In a step 701, the signal fuser 130 fuses the loudspeaker digital signal with the motor digital signal to obtain a first fused digital signal. In a step 702, the signal processor 140 predicts the voltage data loaded on the two ends of the loudspeaker 111 and the voltage data loaded on the two ends of the motor 112 if the fused digital signal transmits to the analog frequency divider 113 and the analog frequency divider 113 performs the frequency division. Further, the signal processor 140 corrects the loudspeaker digital signal and/or the motor digital signal in the fused digital signal according to the voltage data. The corrected loudspeaker digital signal and the corrected motor digital signal are input to the signal fuser 130, and the signal fuser 130 fuses the corrected loudspeaker digital signal with the corrected motor digital signal to obtain a second fused digital signal. In a step 703, the power amplifier 120 performs digital-to-analog conversion on the second fused digital signal to obtain the fused analog signal, and performs power amplification on the fused analog signal. In a step 704, the analog frequency divider 113 performs frequency division on the fused analog signal that is power-amplified to obtain the loudspeaker analog signal to drive the loudspeaker 111 and the motor analog signal to drive the motor 112.

In an embodiment, the operation of correcting the loudspeaker digital signal and/or motor digital signal according to the voltage data in the step 702 includes the following. The phase and/or the amplitude of the loudspeaker digital signal and/or the motor digital signal is corrected in the frequency domain according to the voltage data.

In an embodiment, the method of driving the Combo system described in the above embodiments may further include the following. After the signal processor 140 corrects the loudspeaker digital signal and/or the motor digital signal for the first time, the signal processor 140 determines the loudspeaker amplitude similarity value between the amplitude of the loudspeaker analog signal and the amplitude of the corrected loudspeaker digital signal, the loudspeaker phase similarity value between the phase of the loudspeaker analog signal and the phase of the corrected loudspeaker digital signal, the motor amplitude similarity value between the amplitude of the motor analog signal and the amplitude of the corrected motor digital signal, the motor phase similarity value between the motor of the loudspeaker analog signal and the motor of the corrected loudspeaker digital signal. The signal processor 140 subsequently determines whether to correct the corrected loudspeaker digital signal and/or the corrected motor digital signal again based on the loudspeaker amplitude similarity value, the loudspeaker phase similarity value, the motor amplitude similarity value, and the motor phase similarity value. In some embodiments, the step of determining whether to correct the corrected loudspeaker digital signal and/or the corrected motor digital signal again includes: determining not to correct the corrected loudspeaker digital signal and/or the corrected motor digital signal again in response to each of the loudspeaker amplitude similarity value, the loudspeaker phase similarity value, the motor amplitude similarity value, and the motor phase similarity value being greater than or equal to a predetermined similarity threshold; and determining to correct the corrected loudspeaker digital signal and/or the corrected motor digital signal again in response to any one of the loudspeaker amplitude similarity value, the loudspeaker phase similarity value, the motor amplitude similarity value, and the motor phase similarity value being less than the predetermined similarity threshold.

The above embodiments show only preferred embodiments of the present disclosure, but is not the only limitation of the method of driving the Combo system. In this regard, any ordinary skilled person in the related art may flexibly perform the method based on actual application scenarios and based on the above embodiments.

Figure 8:
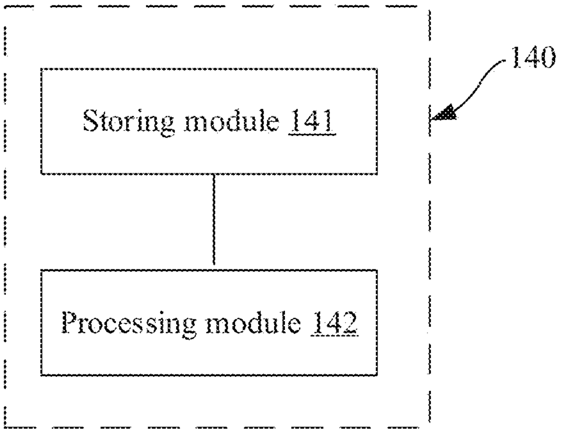
FIG. 8 is a schematic diagram of a signal processor according to one embodiment of the present disclosure.

FIG. 8 is a schematic diagram of modules of the signal processor according to an embodiment of the present disclosure. The present embodiment provides a signal processor 140 that is configured for the Combo system as shown in FIG. 1. In some embodiments, the signal processor 140 is connected to the signal fuser 130 in the Combo system. The signal processor 140 includes a storage module 141 and a processing module 142 connected to the storage module 141. The storage module 141 stores a computer program. The computer program is configured to achieve, when being invoked by the processing module 142, the step of the signal processor 140 correcting the fused digital signal as shown in the above embodiments.

Figure 9:
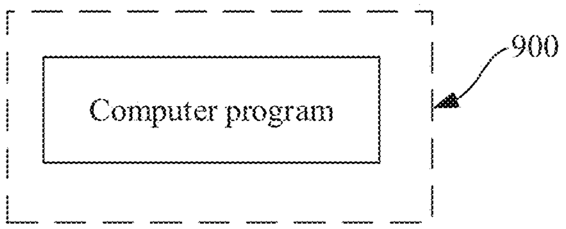
FIG. 9 is a schematic diagram of modules of a computer-readable storage medium according to one embodiment of the present disclosure.

FIG. 9 is a schematic diagram of modules of a computer-readable storage medium according to an embodiment of the present disclosure. The present embodiments provides a computer-readable storage medium 900. In some embodiments, the computer-readable storage medium 900 stores a computer program 901. When the computer program 901 is invoked by the processing module 142 as described in FIG. 8, the computer program 901 is configured to achieve the step of the signal processor 140 correcting the fused digital signal as shown in the above embodiments.

The steps of the method or algorithm described by referring to the embodiments of the present disclosure can be implemented directly by hardware, a software module executed by a processor, or a combination of both. The software module is configured in a random access memory (RAM), an internal memory, a read-only memory (ROM), an electrically programmable ROM, an electrically erasable programmable ROM, a register, a hard disk, a removable disk, a compact disc read-only memory (CD-ROM), or a storage medium in any other form in the related art.

The above embodiments are entirely or partially be implemented by software, hardware, firmware, or any combination thereof. When the embodiments are implemented by the software, it is implemented entirely or partially in a form of a computer program product. The computer program product includes one or more computer instructions. While loading and executing the computer program instructions on a computer, a process or function in accordance with the present disclosure is generated entirely or partially. The computer is a general-purpose computer, a specialized computer, a computer network, or other programmable devices. The computer instructions are stored in a computer-readable storage medium or transmitted from one computer-readable storage medium to another computer-readable storage medium. For example, the computer instructions are transmitted from a network site, a computer, a server, or a data center to another network site, another computer, another server, or another data center by wires (such as coaxial cables, fiber optics, digital subscriber lines) or in a wireless manner (such as infrared, wireless, microwave, and so on). The computer-readable storage medium is any usable medium to which a computer can store data and read data, or is a data storage device, such as a server, a data center, etc., that includes and integrates one or more usable media. The usable medium is a magnetic medium (such as a floppy disk, a hard disk, a tape), an optical medium (such as DVD), or a semiconductor medium (such as a solid state disk).

To be noted that various embodiments in the present disclosure are described in a progressive manner. Each embodiment focuses on a difference with other embodiments, and the common parts of the various embodiments are referred to each other. The product embodiments, au be similar to the method embodiments, and therefore, the product embodiments are described relatively simply, and any relevant part is referred to the description of the method embodiments.

To be noted that any relational term, such as first and second, is used in the present disclosure only to distinguish one feature or one step from another one, but does not require or imply the described features or steps have an actual relationship or an order. Furthermore, the terms “including”, “comprising”, or any other variant thereof, are intended to cover non-exclusive inclusion. Therefore, a process, a method, an article, or an apparatus including a set of elements includes not only the listed elements but also other elements that are not expressly listed or other elements that are inherently included in the process, the method, the article, or the apparatus. Without further limitation, an element defined by the expression of “including a . . . ” does not preclude presence of extra identical elements in the process, the method, the article or the apparatus.

The above description of the embodiments enables any ordinary skilled person in the related art to achieve or use contents of the present disclosure. Various modifications to these embodiments are obvious to any ordinary skilled person in the related art. A general principle defined in the present disclosure is achieved in other embodiments without departing from the spirit or scope of the present disclosure. Therefore, the present disclosure is not limited to these embodiments shown in the present disclosure, but will be subject to the widest scope consistent with the principles and novel features disclosed in the present disclosure.

What is claimed is:

1. A Combo system, comprising:

a loudspeaker, a motor connected in series with the loudspeaker, an analog frequency divider connected to the loudspeaker and the motor, a power amplifier connected to the analog frequency divider, and a signal fuser connected to the power amplifier;

wherein, the signal fuser is configured to fuse a loudspeaker digital signal of the loudspeaker with a motor digital signal of the motor to obtain a fused digital signal; the loudspeaker digital signal comprises an original loudspeaker digital signal, the motor digital signal comprises an original motor digital signal; the power amplifier is configured to perform digital-to-analog conversion on the fused digital signal to obtain a fused analog signal and to perform power amplification on the fused analog signal; the analog frequency divider is configured to perform frequency division on the fused analog signal that is power-amplified to obtain a loudspeaker analog signal and a motor analog signal, the loudspeaker analog signal is configured to drive the loudspeaker, and the motor analog signal is configured to drive the motor;

the Combo system further comprises a signal processor connected to the signal fuser; the signal processor is configured to:

predict voltage data loaded on two ends of the loudspeaker and voltage data loaded on two ends of the motor if the fused digital signal transmits to the analog frequency divider and the analog frequency divider performs the frequency division on the fused digital signal;

correct the original loudspeaker digital signal in the fused digital signal based on the predicted voltage data loaded on the two ends of the loudspeaker to obtain a corrected loudspeaker digital signal and/or correct the original motor digital signal in the fused digital signal based on the predicted voltage data loaded on the two ends of the motor to obtain a corrected motor digital signal; wherein a phase of the loudspeaker analog signal is consistent with a phase of the corrected loudspeaker digital signal; an amplitude of the loudspeaker analog signal is consistent with an amplitude of the corrected loudspeaker digital signal; a phase of the motor analog signal is consistent with a phase of the corrected motor digital signal; and an amplitude of the motor analog signal is consistent with an amplitude of the corrected motor digital signal; wherein the loudspeaker digital signal further comprises the corrected loudspeaker digital signal, and the motor digital signal further comprises the corrected motor digital signal.

2. The Combo system according to claim 1, wherein in a process of correcting the original loudspeaker digital signal and/or the original motor digital signal, the signal processor is configured to: correct the phase and/or the amplitude of the original loudspeaker digital signal in a frequency domain; and/or correct the phase and/or the amplitude of the original motor digital signal in the frequency domain.

3. The Combo system according to claim 1, wherein, after correcting the original loudspeaker digital signal and/or the original motor digital signal in the fused digital signal for a first time, the signal processor is further configured to:

determine a loudspeaker amplitude similarity value between the amplitude of the loudspeaker analog signal and the amplitude of the corrected loudspeaker digital signal, a loudspeaker phase similarity value between the phase of the loudspeaker analog signal and the phase of the corrected loudspeaker digital signal, a motor amplitude similarity value between the amplitude of the motor analog signal and the amplitude of the corrected motor digital signal, a motor phase similarity value between the motor of the loudspeaker analog signal and the motor of the corrected loudspeaker digital signal; and determine whether to correct the corrected loudspeaker digital signal and/or the corrected motor digital signal again based on the loudspeaker amplitude similarity value, the loudspeaker phase similarity value, the motor amplitude similarity value, and the motor phase similarity value.

4. The Combo system according to claim 3, wherein, in the process of determining whether to correct the corrected loudspeaker digital signal and/or the corrected motor digital signal again based on the loudspeaker amplitude similarity value, the loudspeaker phase similarity value, the motor amplitude similarity value, and the motor phase similarity value, the signal processor is configured to:

determine not to correct the corrected loudspeaker digital signal and/or the corrected motor digital signal again in response to: each of the loudspeaker amplitude similarity value, the loudspeaker phase similarity value, the motor amplitude similarity value, and the motor phase similarity value being greater than or equal to a predetermined similarity threshold; and determine to correct the corrected loudspeaker digital signal and/or the corrected motor digital signal again in response to: any one of the loudspeaker amplitude similarity value, the loudspeaker phase similarity value, the motor amplitude similarity value, and the motor phase similarity value being less than the predetermined similarity threshold.

5. The Combo system according to claim 1, wherein the fused digital signal comprises a first fused digital signal and a second fused digital signal;

the signal fuser is configured to: fuse the original loudspeaker digital signal with the original motor digital signal to generate the first fused digital signal; and to input the first fused digital signal to the signal processor;

the signal processor is configured to predict, based on the first fused digital signal, the voltage data loaded on the two ends of the loudspeaker and the voltage data loaded on the two ends of the motor if the first fused digital signal transmits to the analog frequency divider and is divided by the analog frequency divider.

6. The Combo system according to claim 5, wherein the signal fuser is configured to fuse the corrected loudspeaker digital signal with the corrected motor digital signal to generate the second fused digital signal.

7. The Combo system according to claim 6, wherein the power amplifier is configured to perform digital-to-analog conversion on the second fused digital signal to obtain the fused analog signal and perform power amplification on the fused analog signal.

8. A method of driving a Combo system, comprising steps:

fusing, by a signal fuser, a loudspeaker digital signal of a loudspeaker with a motor digital signal of a motor to obtain a fused digital signal, wherein the loudspeaker digital signal comprises an original loudspeaker digital signal, the motor digital signal comprises an original motor digital signal;

performing, by a power amplifier, digital-to-analog conversion on the fused digital signal to obtain a fused analog signal, and performing, by the power amplifier, power amplification on the fused analog signal;

performing, by an analog frequency divider, frequency division on the fused analog signal that is power-amplified to obtain a loudspeaker analog signal and a motor analog signal, wherein the loudspeaker analog signal is configured to drive the loudspeaker, and the motor analog signal is configured to drive the motor;

predicting, by a signal processor, voltage data loaded on two ends of the loudspeaker and voltage data loaded on two ends of the motor if the fused digital signal transmits to the analog frequency divider and the analog frequency divider performs the frequency division on the fused digital signal;

correcting, by the signal processor, the original loudspeaker digital signal in the fused digital signal based on the predicted voltage data loaded on two ends of the loudspeaker to obtain a corrected loudspeaker digital signal; and/or correcting, by the signal processor, the original motor digital signal in the fused digital signal based on the predicted voltage data loaded on two ends of the motor to obtain a corrected motor digital signal; wherein a phase of the loudspeaker analog signal is consistent with a phase of the corrected loudspeaker digital signal; an amplitude of the loudspeaker analog signal is consistent with an amplitude of the corrected loudspeaker digital signal; a phase of the motor analog signal is consistent with a phase of the corrected motor digital signal; and an amplitude of the motor analog signal is consistent with an amplitude of the corrected motor digital signal; wherein the loudspeaker digital signal further comprises the corrected loudspeaker digital signal, and the motor digital signal further comprises the corrected motor digital signal.

9. The method of driving a Combo system according to claim 8, wherein in the step of correcting the original loudspeaker digital signal and/or the original motor digital signal, comprises:

correcting the phase and/or the amplitude, in a frequency domain, of the original loudspeaker digital signal; and/or correcting the phase and/or the amplitude, in the frequency domain, of the original motor digital signal.

10. The method of driving a Combo system according to claim 8, wherein, after the original loudspeaker digital signal and/or the original motor digital signal are corrected for a first time, the method further comprises steps:

determining, by the signal processor, a loudspeaker amplitude similarity value between the amplitude of the loudspeaker analog signal and the amplitude of the corrected loudspeaker digital signal, a loudspeaker phase similarity value between the phase of the loudspeaker analog signal and the phase of the corrected loudspeaker digital signal, a motor amplitude similarity value between the amplitude of the motor analog signal and the amplitude of the corrected motor digital signal, a motor phase similarity value between the motor of the loudspeaker analog signal and the motor of the corrected loudspeaker digital signal; and determining, by the signal processor, whether to correct the corrected loudspeaker digital signal and/or the corrected motor digital signal again based on the loudspeaker amplitude similarity value, the loudspeaker phase similarity value, the motor amplitude similarity value, and the motor phase similarity value.

11. The method of driving a Combo system according to claim 10, wherein the step of determining whether to correct the corrected loudspeaker digital signal and/or the corrected motor digital signal again based on the loudspeaker amplitude similarity value, the loudspeaker phase similarity value, the motor amplitude similarity value, and the motor phase similarity value, comprises:

determining not to correct the corrected loudspeaker digital signal and/or the corrected motor digital signal again in response to: each of the loudspeaker amplitude similarity value, the loudspeaker phase similarity value, the motor amplitude similarity value, and the motor phase similarity value being greater than or equal to a predetermined similarity threshold; and determining to correct the corrected loudspeaker digital signal and/or the corrected motor digital signal again in response to: any one of the loudspeaker amplitude similarity value, the loudspeaker phase similarity value, the motor amplitude similarity value, and the motor phase similarity value being less than the predetermined similarity threshold.

12. The method of driving a Combo system according to claim 8, wherein the fused digital signal comprises a first fused digital signal and a second fused digital signal; and the method comprises:

fusing, by the signal fuser, the original loudspeaker digital signal with the original motor digital signal to generate the first fused digital signal; and inputting, by the signal fuser, the first fused digital signal to the signal processor;

predicting, by the signal processor, based on the first fused digital signal, the voltage data loaded on the two ends of the loudspeaker and the voltage data loaded on the two ends of the motor if the first fused digital signal transmits to the analog frequency divider and is divided by the analog frequency divider.

13. The method of driving a Combo system according to claim 12, wherein the method further comprises: fusing, by the signal fuser, the corrected loudspeaker digital signal with the corrected motor digital signal to generate the second fused digital signal.

14. The method of driving a Combo system according to claim 13, wherein the method further comprises: performing, by the power amplifier, digital-to-analog conversion on the second fused digital signal to obtain the fused analog signal and perform power amplification on the fused analog signal.

15. A non-transitory computer-readable storage medium, comprising: a computer program stored therein; wherein the computer program is configured to perform, when being invoked by a processor, the step of correcting the fused digital signal according to claim 8.

* * * * *